United States Patent
Gilbert et al.

(10) Patent No.: US 6,236,722 B1
(45) Date of Patent: May 22, 2001

(54) METHOD AND SYSTEM FOR USING TCAP SIGNALING FOR IMPROVED CALL SETUP FROM A VIRTUAL SWITCHING POINT

(75) Inventors: Gordon J. Gilbert, New Market; L. Lloyd Williams, Kanata, both of (CA)

(73) Assignee: Bell Canada, Montreal (CA)

( * ) Notice: Subject to any disclaimer, the term of this patent is extended or adjusted under 35 U.S.C. 154(b) by 0 days.

(21) Appl. No.: 09/071,092

(22) Filed: May 1, 1998

(51) Int. Cl.[7] .................................................. H04M 3/00
(52) U.S. Cl. ........................ 379/230; 379/220; 379/207
(58) Field of Search .................................... 379/230, 220, 379/221, 207, 201, 900

(56) References Cited

U.S. PATENT DOCUMENTS

| | | | |
|---|---|---|---|
| 5,282,244 | 1/1994 | Fuller et al. | 379/230 |
| 5,583,926 | 12/1996 | Venier et al. | 379/207 |
| 5,586,177 | 12/1996 | Farris et al. | 379/230 |
| 5,602,909 | 2/1997 | Carkner et al. | 379/207 |
| 5,610,977 | 3/1997 | Williams et al. | 379/207 |
| 5,881,132 | * 3/1999 | O'Brien et al. | 579/230 |

\* cited by examiner

*Primary Examiner*—Creighton Smith
(74) *Attorney, Agent, or Firm*—Thomas, Kayden, Horstemeyer & Risley, L.L.P.

(57) ABSTRACT

A method and system for using TCAP signaling for improved call setup from a virtual switching point are disclosed. In accordance with the method, TCAP signaling is used to enhance call setup from virtual switching points which receive call request messages from calling parties using a facility on a data network such as the Internet. TCAP signaling is used when necessary to determine the availability of the called party telephone. The system includes a Virtual Switching Point (VSP) in a switched telephone network having a connection to a data network such as the Internet. Call requests are received by the VSP from the data network and processed by the VSP to establish a voice connection between the calling party which initiates the call request and a called party number indicated in the call request message. The use of TCAP signaling from the VSP to Switching Points (SPs) which serve the calling party and/or the called party improves efficiency and minimizes common channel signaling. The VSP enabled with TCAP signaling can also be used as an efficient out-dialer for a call center. The advantage is the ability to offer more calling options while improving network use efficiency.

44 Claims, 6 Drawing Sheets

METHOD AND SYSTEM FOR USING TCAP SIGNALING FOR IMPROVED CALL SETUP FROM A VIRTUAL SWITCHING POINT

RELATED APPLICATIONS

This application is related to applicant's co-pending U.S. patent application Ser. No. 08/996,879 entitled METHOD AND SYSTEM FOR COMPLETING A VOICE CONNECTION BETWEEN FIRST AND SECOND VOICE TERMINALS IN A SWITCHED TELEPHONE NETWORK which was filed on Dec. 23rd, 1997, the specification of which is incorporated herein by reference in its entirety.

TECHNICAL FIELD

This invention relates generally to the completion of voice connections in a switched telephone network, and in particular to the completion of voice connections in a switched telephone network using a data request message for initiating the voice connection and TCAP common channel signaling messages as required to determine the availability of a voice terminal involved in the call.

BACKGROUND OF THE INVENTION

Computer telephony integration products are well-known and widely used to provide personal as well as corporate telephone services. The use of computer telephony integration products permits enhanced dialling and call handling features. A shortcoming of such products is that those features are enabled outside the Public Switched Telephone Network (PSTN). Consequently, call completions effected using such products often use redundant circuits in the PSTN. Efficiency is therefore sacrificed. A further disadvantage of such products is that they have no access to the signaling network which controls the PSTN. Consequently, such products are incapable of determining the status of a remote user line or querying PSTN nodes to obtain information useful in call setup or call direction. There therefore exists a need for computer telephony integration products that are more completely integrated with the PSTN.

Another commonly used system in the PSTN are call centers which offer customer support, help lines, or the like. Such centers typically use an out-dialer to set up calls to a predetermined list or queue of numbers which are to be called. To improve performance, algorithms have been developed to predict when an agent will become available to take a call, and calls are placed in advance of agent availability. If a number dialled is not answered, the number is moved to a bottom of the queue and retried when it has advanced again to the top of the queue. Due to the fact that such dialers have no access to the PSTN signaling network, it is difficult or impossible to write algorithms to accurately and consistently determine the reason that any particular call is not answered when dialed. Consequently, calls may be attempted many times over even though there is no probability of reaching the called party. This wastes transport and signaling facilities and ties up resources that could be profitably used by others. There therefore exists a need for better out-dialer facilities for call centers.

In the applicant's co-pending patent application described above, a method and a system for completing voice connections between voice terminals in a Switched Telephone Network (STN) using the flexibility of computer control exercised through a data network independently of voice terminals connected to the network was disclosed. The method and system provide several advantages over prior art methods of completing voice connections. First, it provides all the advantages and flexibility of computer control, including automated dialling from electronic telephone books or directories. It also provides the advantage of sequential calling without disconnection of the calling party so that a plurality of sequential calls may be completed without interrupting the user's voice connection with an originating switching point (SP) in the STN.

The system disclosed in applicant's co-pending application includes a Virtual Switching Point (VSP) which is a physical node in the signaling network of the STN and a virtual node in the transmission network of the STN. The VSP is enabled to receive call request messages from a data network such as a local area network (LAN), a wide area network (WAN), an Intranet or the Internet. The VSP processes the call request which may include more than one called number. A call request is processed by sending a common channel signaling message from the VSP to an SP in a local calling area of the calling party to initiate a voice connection with the calling party. After the connection is established with the calling party, a second common channel signaling message is sent to a switching point in the STN to initiate a connection with the called party. The two connections are the first and second legs to the same call. The voice connections may be local or long distance voice connections.

While this system provides significantly improved functionality over the computer-integrated telephony systems of the prior art, and capitalizes on the inherent switching capability of the PSTN, it does not capitalize on the inherent query capability of a common channel signaling network. In particular, the common channel signaling system, Signaling System 7 (SS7) provides a query signaling capability known as Transaction Capability Application Part (TCAP) signaling. TCAP signaling provides a powerful query tool which may be used by physical nodes in an SS7 network.

There therefore exists a need for call completion systems which use the inherent switching power resident in the PSTN as well as the inherent query capability resident in the common channel signaling network that controls the PSTN.

SUMMARY OF THE INVENTION

It is an object of the invention to provide a method for using TCAP signaling for improved call setup from a Virtual Switching Point in a Switched Telephone Network.

It is a further object of the invention to provide a method using TCAP signaling messages which originate from a signaling node in the STN for improved call setup.

It is another object of the invention to provide a method for using TCAP signaling messages in an STN to determine the availability of a calling party's voice terminal in order to minimize Integrated Services Digital Network User Part (ISUP) signaling during initial call setup.

It is yet a further object of the invention to provide a system for using TCAP signaling for improved call setup from a Virtual Switching Point (VSP) in an STN in which the VSP is a physical node in the signaling network and a virtual node in the transmission network of the STN.

It is another object of the invention to provide a system for using TCAP signaling for improved call setup from a VSP wherein the TCAP signaling is used to determine the availability of a called voice terminal when a first attempt to call that voice terminal indicates that the voice terminal is busy.

It is yet another object of the invention to provide a system for using TCAP signaling for improved call setup for a call center where a plurality of predetermined call requests must be completed.

The invention therefore provides a method of completing a voice connection between a first and second voice terminal on a Switched Telephone Network (STN), comprising the steps of:

receiving at a Virtual Switching Point (VSP) in the STN having a connection to a data network a call request message;

sending a query message to an SP in the STN that serves the calling party to determine the availability of a calling line identified in the call request;

if a response to the query message indicates that the calling line is available, sending a first Common Channel Signaling (CCS) message from the VSP over a signaling network of the STN to an SP in the STN to initiate a first leg of the voice connection, and sending a second CCS message from the VSP to an SP in the STN to initiate a second leg of the voice connection, the first and second CCS messages being interrelated to an extent that a circuit identification code in each message is associated with opposite ends of the same facility.

In particular, the invention provides a method for using TCAP signaling for improved call set up from a virtual switching point (VSP) in a switched telephone network (STN), comprising:

receiving through a data network a call request message at the VSP, the call request message indicating a calling party number and at least one called party number;

sending a TCAP query message through a common channel signaling system of the STN to a switching point (SP) which serves the calling party number to determine when the calling party number is available to receive a call in response to the message; and on receipt of a TCAP reply message indicating that the calling party number is available to receive the call, initiating from the VSP a call connection between the calling and called party numbers.

The invention further provides a system for using TCAP signaling for improved call set up in a switched telephone network (STN), comprising;

a virtual switching point (VSP) which is a physical node in a common channel signaling network of the STN and a logical node in a transport network of the STN, the VSP having TCAP signaling capability;

a plurality of switching points (SPs) in the STN, at least a portion of the SPs in the STN having TCAP signaling capability; and a trunk facility in the STN, the VSP being a logical switching node logically located between physical ends of the trunk facility.

The invention also provides a method of completing calls for a call center having a predetermined list of numbers to be called, comprising:

placing the list of numbers to be called in a memory queue which may be accessed by a virtual switching point (VSP) in the network;

formulating a first IAM at the VSP, the IAM containing a called number from the queue, and forwarding the IAM to initiate a call connection with the called number; and on receipt of an Address Complete (ACM) and an Answer (ANM) message in response to the first IAM, formulating a second IAM at the VSP, the second IAM including a number of the call center as the called number and forwarding the second IAM to connect the called number with the call center.

The invention likewise provides an out-dialer for a call center, comprising:

a virtual switching point (VSP) which is a physical node in a signaling network of a switched telephone network (STN) which serves the call center, the VSP being a physical node in a signaling network which controls the STN and a virtual node in at least one transport facility of the STN; and a memory queue accessible by the VSP, the memory queue containing at least one list of called numbers to which calls are to be set up by the VSP.

The invention therefore provides a method of completing a voice connection between first and second voice terminals on an STN using TCAP signaling for improved call setup from a VSP. The VSP is a physical node in the signaling network of the STN and a logical node in the transport network of the STN. The VSP receives call request messages through a data connection. The call request messages are requests to set up call connections between a calling party which originates the call request messages and one or more called parties with which the calling party wishes to be connected.

Call request messages may be initiated by users who log on to a server which may be accessed through a data network. The server may be a world-wide web server which is accessed through the Internet. Many calling parties have only single line access to the STN and use that access for both data communications and voice communications. Consequently, many calling parties use the same calling line connection to the STN for originating call request messages and for accepting calls set up by the VSP in response to the call request messages. On receipt of a call request message, the VSP is unaware of whether the calling party line has yet become available to accept a call. Consequently, the VSP preferably sends a TCAP message to an SP in the STN which serves the calling party. The TCAP message requests that the SP monitor the calling party line to determine when it is available to accept calls. When the calling party line becomes available, a TCAP message is returned to the VSP which prompts the VSP to commence call setup in response to the call request message. Thus unnecessary ISUP messaging is avoided, and the STN's common channel signaling system is efficiently used.

This method can also be used under certain circumstances to efficiently determine the availability of a called party line. In normal call processing, it is most efficient to send an ISUP Initial Address Message (IAM) to initiate a call connection with the called party. If the called party station is busy, a Release message is returned in response to the ISUP IAM message. When a Release message is received in response to an IAM, and the calling party has a single line connection to the STN, the VSP may connect the calling party to an Interactive Voice Response unit (IVR) to obtain information about how the calling party prefers the VSP to proceed. A number of predefined options may be provided to the calling party by the IVR, which permits the calling party to select a preferred option for continuing with the call request. After the calling party indicates a preferred option, the IVR passes the preferred option to the VSP which responds accordingly.

Among the preferred options that may be presented are options which instruct the VSP to monitor the called party line. The monitoring is accomplished using a TCAP query message sent to an SP which serves the called party line. The TCAP query message requests that the SP monitor the called party line and advise the VSP when the called party line becomes available to accept a call. In accordance with another option, the VSP may be requested to monitor the called party line during a specific future time interval, the time interval being specified to the IVR by the calling party.

The method and system in accordance with the invention can also be used to improve call setup for call centers having a plurality of predetermined calls to be completed.

The system in accordance with the invention permits intelligent call setup for such call centers and eliminates the problems prevalent in the prior art. If a VSP is used for establishing call center connections to predetermined lists of called numbers, transport and signaling facilities are efficiently used. Using the system of the invention when the VSP attempts a call setup to a called party number which returns an ISUP Release (REL) message, the VSP sends a TCAP message to determine a status of the line. If the line is idle, it is assumed that the party is not at the number. The number is therefore unqueued and added to a rejection list to be tried later or on another day. If the status returns a "busy" condition, the VSP sends a TCAP message requesting that the called party's SP perform a line scan to determine when the line is available. When a TCAP response is returned indicating the called party line is available, the number is queued ahead and the call attempted if an agent is available or predicted to be soon available.

The method and system in accordance with the invention therefore significantly improves the functionality of the VSP and can significantly reduce the amount of ISUP signaling required to set up call connections.

BRIEF DESCRIPTION OF THE DRAWINGS

The invention will now be further explained by way of example only and with reference to the following drawings wherein.

DETAILED DESCRIPTION OF THE PREFERRED EMBODIMENT

This invention relates to a method and system for using TCAP signaling for improved call setup using a virtual signaling point (VSP) in a switched telephone network (STN).

Figure 1:
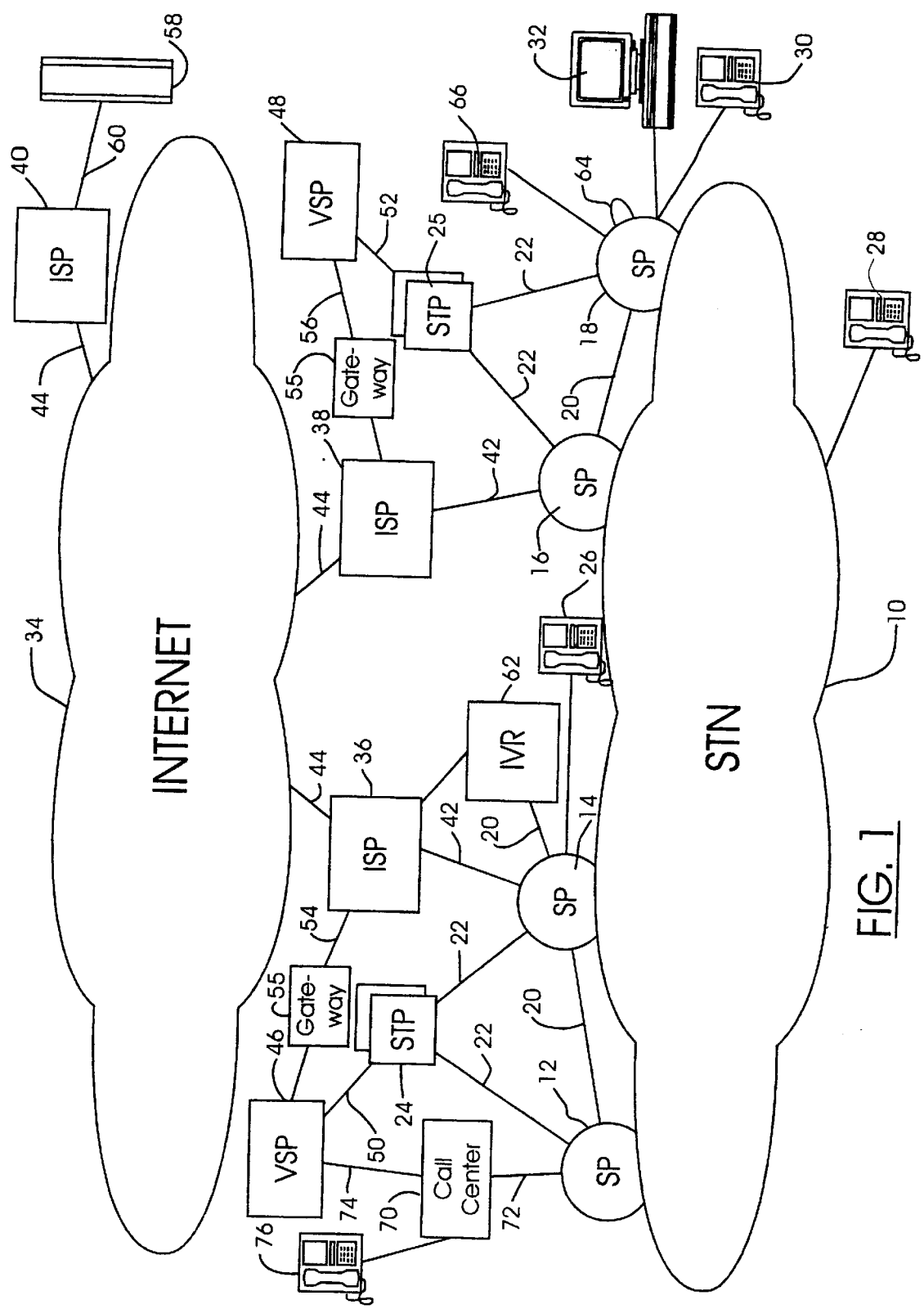
FIG. 1 is a schematic diagram of a switched telephone network equipped with a system in accordance with the invention for using TCAP signaling for improved call setup from a virtual switching point.

FIG. 1 is a schematic diagram of an STN 10 equipped with a system for practising methods in accordance with the invention. The STN 10 includes a plurality of switching nodes generally referred to as Switching Points (SP) 12,14, 16 and 18 as well as a plurality of other SPs which are not illustrated. The SPs 12–18 are connected to the STN and to each other by trunk groups 20 which are facilities for transporting voice, fax or data. The STN includes a signaling network and a transmission network. The trunk groups 20 are part of the transmission network. A plurality of signaling links make up the signaling network of the STN. Each signaling link 22 connects an SP 12–18 with a Signal Transfer Point (STP) 24,25. The STPs 24,25 are normally arranged in redundant pairs and each SP 12–18 has a signaling link 22 to each of the STPs 24,25 in the pair. Normally, the STP pairs 24,25 are also interconnected with signaling links in a manner well known in the art, although for the sake of simplicity those links are not shown in FIG. 1.

The SPs 12–18, the STP pairs 24,25 the trunks 20 and the signaling links 22 comprise the basic components of the STN 10. An STN 10 will normally include at least one Service Control Point (SCP) which for the sake of simplicity is not illustrated as it is not directly relevant to the invention. The STN 10 serves a plurality of subscribers having voice terminals 26, 28, 30 and 66. The subscribers may also have Personal Computers (PC) 32 connected to the STN by a dial-up connection. Among other things, the PCs 32 are normally used to access the Internet 34 through an Internet Service Provider (ISP) 36,38 or 40. The ISPs 36,38 are connected to SPs 14,16 by data transmission links 42 which may be a T1 trunk with a modem attached to each end, an Integrated Services Digital Network Basic Rate Interface (ISDN, BRI), a line appearance with a modem attached to each end, a splitter with an Asynchronous Digital Subscriber Loop (ADSL) connection, or the like. The ISPs 36,38,40 are connected to the Internet 34 by data transmission links 44 which may be any one of the data links described above, for example.

The system in accordance with the invention includes a Virtual Switching Point (VSP) 46,48. Each VSP 46,48 is a physical node in the signaling network of the STN and a virtual node in the transmission network of the STN, as will be explained below in some detail. As a physical node in the signaling network, VSP 46 is connected to the STP pair 24 by a signaling link 50 and the VSP 48 is connected to STP pair 25 by a signaling link 52. The signaling links 50,52 may be A, B or D links, as is well known in the art. The VSP 46 is also connected to the ISP 36 by a data link 54 and the VSP 48 is connected to the ISP 38 by data link 56. Internet gateways 55 are deployed on links 54,56 to protect the CCS network from unauthorized use. The data links 54,56 may comprise any data transmission link such as a line appearance with a modem on each end, and may use a transmission protocol such as the TCP/IP protocol.

The system shown in FIG. 1 further includes a public server 58 which may be a World Wide Web (WWW) server well known in the art. The public server 58 is connected to the ISP 40 by a data link 60. The system may further include an Interactive Voice Recognition Unit (IVR 62) connected to SP 14 by a trunk 20, typically a DS1 or a T1 facility. The function of the VSPs 46,48; the public server 58 and the IVR 62 will be explained below in some detail.

The system shown in FIG. 1 is intended to be used by subscribers to the STN 10 having PCs 32 with access to the Internet 34. Using the system in accordance with the invention, a subscriber with a PC 32 is able to set up call connections by accessing the public server 58. Call requests are entered at the public server 58. The public server 58 passes the call requests to a VSP located in a local calling area of the subscriber making the request. In the example which follows, the subscriber uses PC 32 to make a call request, which is forwarded by the public server 58 to the VSP 48. As will be explained below in more detail, on receipt of the call request, the VSP 48 sends a first signaling message to the SP 18 to establish a first voice connection with the subscriber telephone 30. After the SP 18 confirms a connection with the subscriber telephone 30, the VSP 48 sends a second common channel signaling message to an SP in the STN to initiate a second leg of the voice connection between the subscriber telephone 30 and a called party which may be any one of subscriber telephones 26,28 or 66. The SP which receives the second common channel signaling message depends on the structure of the network and, to a lesser extent, the location of the called party. In order to ensure that signaling messages which permit the VSP 48 to control the call connection are routed through the VSP 48, the call must be routed over facilities which are logically, though not physically, connected to the VSP 48. This may be accomplished in at least one of the two ways. For example, a loop-back trunk group 64 connected to SP 18 may be assigned link sets which are associated with the VSP 48 as if the VSP 48 were a physical switching node in the loop-back trunk group 64. Likewise, one or more members of the trunk groups 20 may be assigned to a trunk group whose link set indicates that the VSP 48 is a switching point in the trunk group, as was explained in detail in applicant's co-pending patent application referenced above.

The system shown in FIG. 1 further includes a call center 70, typically a call center for telemarketing or customer support which has a mandate to place calls to a predetermined number of called numbers. Such centers typically include an automatic call distributor (ACD) or a private branch exchange (PBX) for distributing calls to a number of agents. The call center 70 is connected by one or more trunks 72 to SP 12. Trunk 72 is typically a number of DS0 trunks, an ISDN trunk, or the like. A call center 70 equipped in accordance with the invention is also connected by a data communications link 74 to the VSP 46. The data communications link 74 need not be a direct connection. It may be, for example, a connection through an ISP to the Internet or some other arrangement which permits the VSP 46 and call distribution facilities at the call center 70 to exchange data messages. One use of the data connection 74 is to permit the VSP 46 to track the number of agents available and their busy/idle status, as will be explained below in more detail with reference to FIG. 4.

Figure 2:
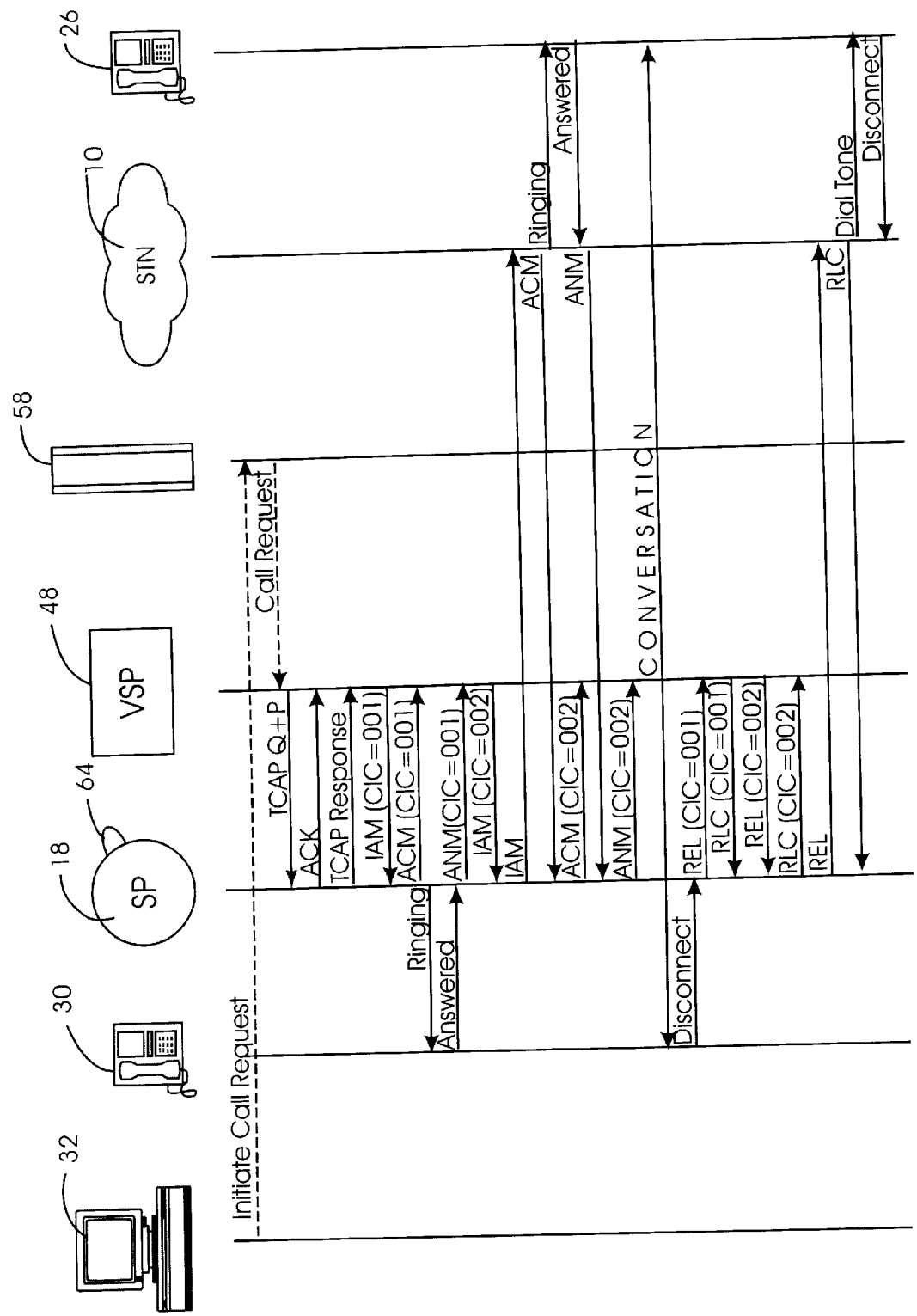
FIG. 2 is an exemplary call flow sequence showing principal actions in a call setup and release using the method and system in accordance with the invention.

FIG. 2 shows a schematic illustration of a call flow sequence illustrating the principal actions in a call setup and release sequence in accordance with the invention. As shown in FIG. 2, a calling party using a single line connection to the STN 10 initiates a request by logging on to a public server 58 and completing a form requesting a calling session in which at least one called party number is supplied to the web server 58. After the calling party using PC 32 completes the form on web server 58, the web server 58 forwards a call request data message indicated by the dashed line at the top of FIG. 2 over data link 60 to the ISP 40, through the Internet 34, the ISP 38, the gateway 55 and the data link 56 to the VSP 48 (see FIG. 1.). On receipt of the call request message, VSP 48 forwards a TCAP query message over the SS7 signaling network of the STN 10 to SP 18 requesting that the SP 18 monitor the called party line to determine when the called party line is available to receive a call connection.

Since many STN subscribers have only single line access to the STN, they use the single line to connect to both the Internet 34 for data services and the STN 10 for voice services. Consequently, when a call request is received by the VSP 48, the VSP 48 may automatically send a TCAP query to the calling party's SP. Alternatively, the form completed by the calling party using PC 32 may include an indication of whether the calling party has single line access to the STN. In that instance, the TCAP query shown in FIG. 2 is sent only when the form indicates that the calling party has single line access to the STN. If the calling party has multiple line access to the STN, a TCAP query is not sent unless a first call attempt to the calling party's telephone 30 is unsuccessful.

The TCAP query message sent to the SP 18 is a Query with Permission (QUERY+P). The query message is sent to request that the calling party's SP monitor the calling party's telephone line to determine when the line becomes idle. Normally, the SP 18 will respond with an acknowledgement message in the form of a TCAP message type known as Conversation with Permission (CONVERSATION+P) to indicate to the VSP that the originating switch will perform scanning of the calling line. When the calling line becomes available, SP 18 will return a TCAP RESPONSE message to the VSP 48 to inform the VSP 48 that the calling party's line is available. As an alternative to this sequence, the VSP 48 may use a QUERY+P message to query the busy/idle status of the calling party's line. That query normally returns an immediate TCAP RESPONSE from the SP 18 with an indication of the busy/idle status of the calling party line. The busy/idle status query may be used as an initial inquiry, rather than a request for scanning of the line. The choice of initial queries is dependent on the information available to the VSP, as well as the elapsed time since receipt of the call request message.

In either case, when the VSP 48 has received confirmation that the calling party line is available, the VSP 48 sends a first IAM with a circuit identification code (CIC)="001", for example as described in applicant's co-pending application incorporated herein by reference. On receipt of the IAM, the SP 18 checks the availability of the calling party's line and returns an Address Complete (ACM) message with a CIC= 001 to the VSP 48 indicating that the calling party line is available. Concurrently, the SP 18 applies a ringing signal to the calling party line which causes the calling party's telephone 30 to ring.

When the calling party answers the telephone 30, the SP 18 returns an Answer (ANM) message to the VSP 48 with the CIC=001. On receipt of the ANM message, the VSP 48 immediately formulates and transmits a IAM message with a CIC=002 (the opposite end of the loop-back trunk 64) to the SP 18. The SP 18 receives that IAM and assumes that there is an incoming call on the loop-back trunk 64. It examines the called number in the IAM and determines that the caller is served by another SP in the STN 10, SP 14 for example. The SP 18 therefore formulates an appropriate IAM and transmits it into the signaling network of the STN 10. STN 10 forwards the IAM to the SP 14 which checks the availability of the called party line. On finding the called party line available SP 14 returns an ACM message to the SP 18. Concurrently, the SP 14 applies a ringing signal to telephone 26. On receipt of the ACM message at SP 18, the SP 18 returns to the VSP 48 an ACM message with a CIC=002.

This completes the call connection between the calling party's telephone 30 and the called party's telephone 26. When the called party at telephone 26 answers the call, an ANM is returned through the STN 10 to the SP 18 which in turn returns the ANM to the VSP 48. Since the call connection is completed, conversation between the calling and the called party at telephones 30,26 proceeds until one party disconnects.

In this example, a disconnect is received from the calling party 30. When the calling party 30 goes on-hook, the SP 18 sends a release message with a CIC=001 to the VSP 48. Since the VSP 48 recognizes that the release message belongs to a call which it initiated, the VSP discards the release message and returns a release complete (RLC) with CIC=001 to the SP 18. The VSP likewise formulates and returns an REL message with a CIC=002 to the SP 18 in order to release the second half of the call. On receipt of the REL message, SP 18 returns an RLC message with CIC=002 to the VSP 48 and formulates and sends an REL message through the STN 10 to the SP 14. On receipt of the REL message, the SP 14 returns an RLC message to the SP 18. Thereafter it applies dial tone to the telephone line of user 26 which responds by going on-hook and the call series is completed.

As described in applicant's co-pending application, the call request initiated by the calling party using PC 32 may have included several called numbers in which case the calling party would normally not be disconnected from the SP 18 and the VSP on receipt of a release from the called party's SP would proceed with setting up a call connection to the next called number.

Figure 3A:
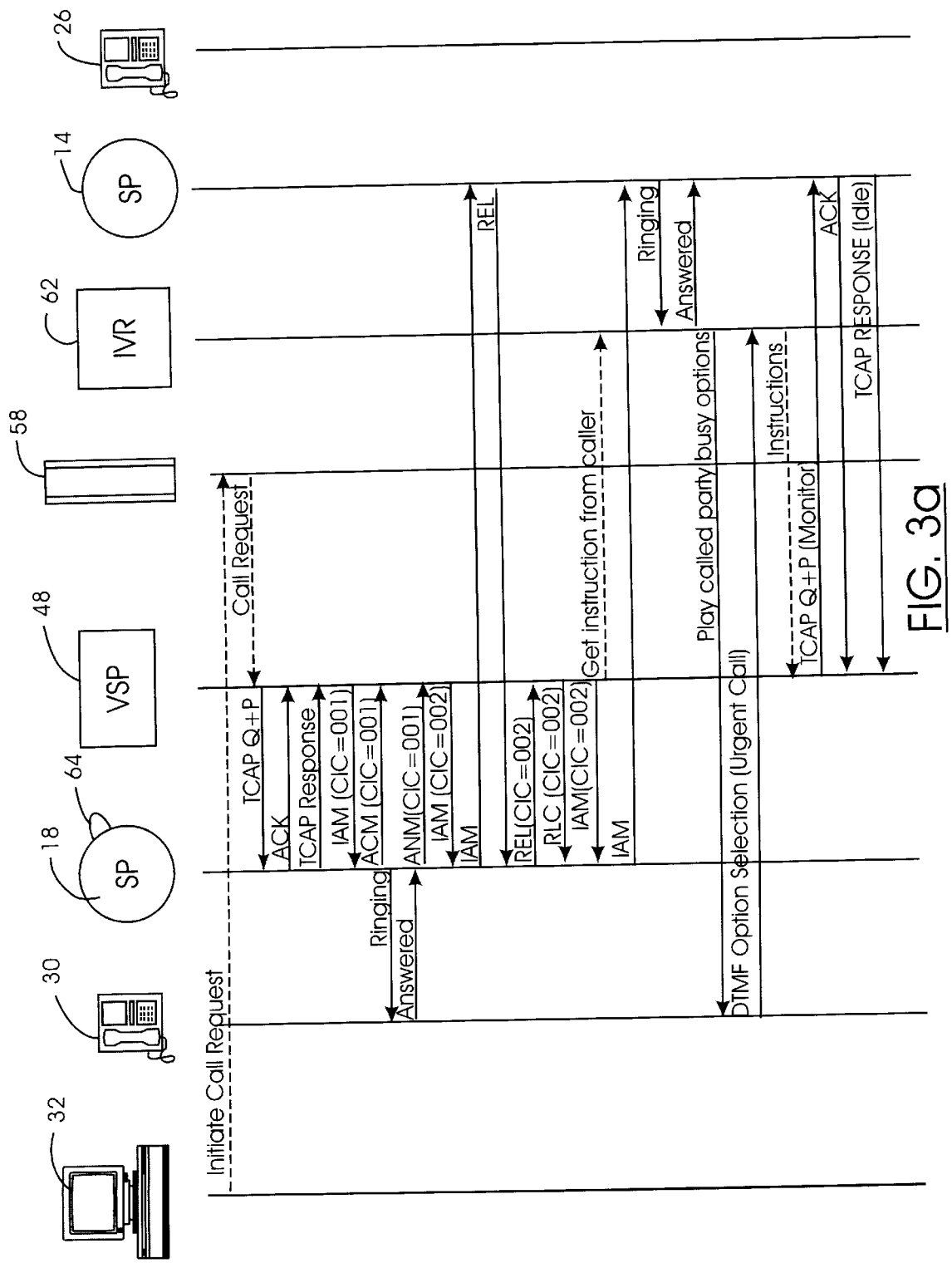
FIGS. 3a and 3b show an exemplary call flow illustrating showing principal actions in call setup in accordance with another use of the method and system in accordance with the invention.
Figure 3B:
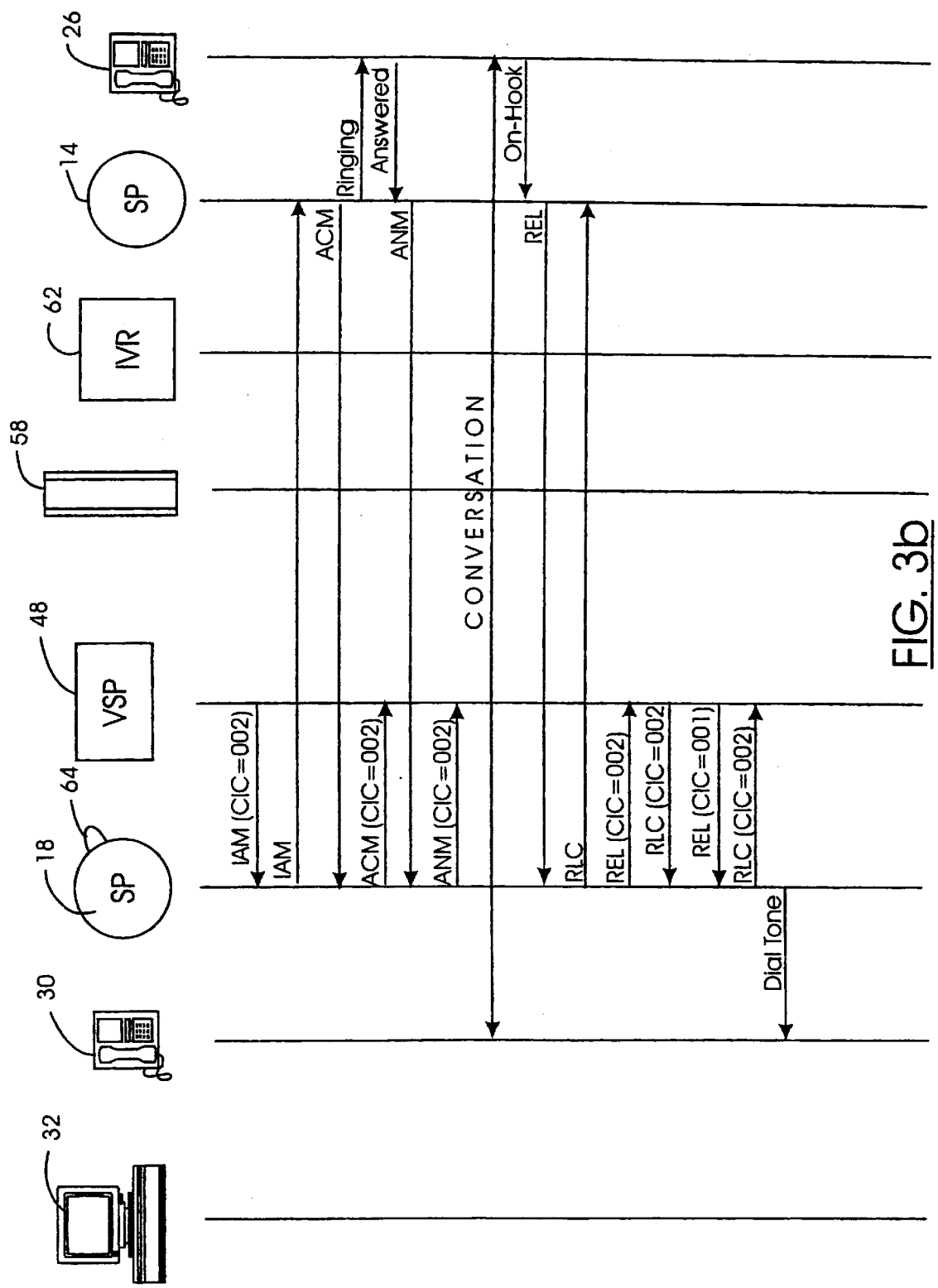

FIGS. 3a and 3b show a portion of a call message flow involved in the handling of a call request initiated by a calling party at PC 32. As described above, the calling party using PC 32 accesses web server 58 and initiates a call request which is sent through the Internet to the web server 58 and forwarded through the Internet to the VSP 48. In this example, the call request indicates that the calling party using PC 32 has single line access to the STN 10. The VSP 48 therefore forwards a TCAP QUERY+P message to the SP 18 requesting that the SP 18 scan the calling party's telephone line to determine when the line becomes available to receive a call. The SP 18 responds with an acknowledgement message, as described above, followed when the calling line becomes available with a TCAP RESPONSE message indicating that the calling line is available to receive a call. As also described above, this prompts the VSP 48 to initiate a call setup in which the VSP 48 connects a first leg of the call connection with the calling party at telephone 30 and then initiates a second leg of the call connection by sending an IAM through the STN 10 to the SP 14.

In this example, the called line 26 is busy and the SP 14 returns a release message to the SP 18. On receipt of the REL message from the SP 18, the SP 18 formulates an REL message with a CIC=002 and forwards it to the VSP 48. The SP 14 also returns an RLC message to the SP 14 through the STN 10. On receipt of the REL message, the VSP 48 returns an RLC to the SP 18 with a CIC=002. VSP 18, having received information that the called party at telephone 26 is not available, and that the calling party at telephone 30 has a single line connection to the STN 10, is programmed to connect the telephone 30 to an IVR 62 (FIG. 1) in order to obtain information from the calling party about how to proceed. To accomplish this, the VSP sends an IAM with a CIC=002 to the SP 18 and a called number of the IVR 62. The SP 18 determines that the IVR 62 is served by another SP in the STN 10. It therefore forwards an IAM through the STN 10 to the SP 14 which serves the IVR 62. Ensuing ACM and ANM messages are exchanged, as illustrated. Those messages follow the same sequence as the ACM and ANM described with reference to the top half of the diagram. After sending the IAM to connect the called party telephone 30 to the IVR 62, the VSP also sends a data message to the IVR 62 informing the IVR 62 of the call and requesting that the IVR 62 begin an interactive session with the calling party telephone 30 in order to get instructions as to how the balance of the call request session is to be handled. When the call connection with the IVR 62 is effected, the IVR plays a pre-recorded message to the calling party at telephone 30 requesting that the calling party select an option regarding how the calling session should proceed. A few of the possible options which may be enabled are as follows:

a) the call attempt to the called party may be abandoned and the next called party number in the call request message attempted;

b) the calling party line may be held open and a request to monitor the called party line sent to the VSP 48, in which case the calling party is held at the IVR until the called party line becomes available;

c) the calling party may request that they be disconnected from the call, but the called party line monitored, in which case the VSP 48 would attempt to recomplete the call connection once the called party line becomes available;

d) the call may be abandoned but the called party line monitored, if the calling party has a call waiting feature. In that case, as soon as the called party line became available the VSP completes a call connection between the calling and called party lines, and the calling party uses the call waiting feature to connect to the called party line;

e) the calling party may specify a time interval during which VSP should monitor the called party line and if the called party line becomes available during the time interval, the VSP attempts to complete the call connection between the calling and the called party lines.

It should be understood by those skilled in the art that the five options described above are exemplary only. Other options may be used or only some of the options described above need be implemented.

If the calling party selects option a), the call is simply abandoned and control is returned to the VSP which attempts to complete the call connection between the calling party and the next called party umber in the call request message.

If the calling party selects option b), a TCAP query is sent by the VSP 48 to the SP which serves the calling party requesting that the SP scan the called party line and advise the VSP as soon as the called party line becomes available to accept the call. In the meantime, the call is held by the IVR. The IVR 62 preferably plays auditory content to the caller while the caller is held. The auditory content may be any desirable content including recorded music, a radio station, advertisements, or interactive entertainment which the IVR 62 is programmed to provide.

If the user selects option c), the user is aware that there are no further called numbers in the call request message and the user prefers not to be held on the line while waiting for the called party to become available. The VSP 48 therefore disconnects the calling party line from the IVR 62 and sends a query message to the SP 14 to monitor the called party line. When the SP 14 returns a RESPONSE message indicating that the called party line is available, the VSP attempts to create a call connection between the calling party line and the called party line as described above with reference to FIG. 2.

If the user elects option d), the call attempt is abandoned and the VSP attempts to establish a call connection between the calling party and the next called party in the call request message. The VSP simultaneously sends a TCAP QUERY+P message to the SP 14 through the STN 10 requesting that the SP 14 monitor the called party line and notify the VSP 48 when the called party line becomes available to receive a call. When the VSP 48 receives a RESPONSE message from the SP 14 indicating that the called party line is available, the VSP 48 preferably formulates a first IAM to establish a connection with the calling party telephone 30 followed immediately by a second IAM to establish a connection with the called party telephone 26, without waiting for the receipt of ACM and ANM messages. Since the calling party is known to have a call waiting feature, it is assumed that the calling party will respond to the call. Since the VSP 48 has just been notified that the called party line is available, there is an excellent probability that the called party will answer the call.

If the user selects option e), the user must specify a time interval when the VSP 48 should monitor the called party line for availability. This option would normally be used by a calling party which expects to be available during a certain period of the day, say from 2:00–4:00 p.m. On receipt of option e) returned from the IVR 62, the VSP 48 queues a monitoring request. When its clock indicates 2:00 p.m., the VSP 48 sends a TCAP QUERY+P message to the SP 14 requesting that it report the line status of the called party. If the SP 14 reports that the called party line is busy, the VSP 48 returns a TCAP QUERY+P message requesting that the SP 14 scan the called party line and advise the VSP 48 when the line becomes available. If the SP 14 responds before 4:00 p.m. that the calling party line is available, the VSP 48 responds by formulating a first IAM which initiates a call request to the calling party line. After the calling party answers, the VSP 48 initiates a second IAM to complete a second leg of the call connection as described with reference to FIG. 1.

Returning again to FIG. 3a, after the IVR 62 plays the called party busy options to the calling party at telephone 30, the calling party returns DTMF signals by keying a selection which indicates option b) because the calling party 30 urgently wishes to reach the called party at telephone 26. Those instructions are forwarded via a data connection from the IVR 62 to the VSP 48. On receipt of the instructions, the VSP 48 immediately launches a TCAP QUERY+P message to the SP 14 through the STN 10 requesting that the SP 14 monitor the line of telephone 26. The SP 14 returns an acknowledgement through the STN 10 and begins a scan of the called party line. When telephone 26 goes on-hook, the SP 14 returns a TCAP RESPONSE message through the STN 10 advising the VSP 48 that the calling party line is available.

As shown in FIG. 3b, immediately on receipt of the TCAP RESPONSE, the VSP 48 formulates an IAM with a CIC=002 and a called number of the telephone 26 which it forwards to SP 18. On receipt of the IAM, the SP 18 formulates an IAM which it forwards through the STN 10 to the SP 14. On receipt of the IAM, the SP 14 checks the availability of the called party line 26 and, finding it available, returns an ACM message to the SP 18 which causes the SP 18 to formulate an ACM message with a CIC=002 which it returns to the VSP 48. Concurrently, the SP 14 applies a ringing signal to the calling party line which causes the telephone 26 to ring. When the calling party answers, the SP 14 returns the ANM through the STN 10 to the SP 18 which in turn forwards an ANM with a CIC=002 to VSP 48. This establishes a connection between the calling party telephone 30 and the called party telephone 26 and conversation ensues. Thereafter, the call progresses in accordance with the remainder of the call request message which may initiate further calls between the parties or may release the connections as described above with reference to FIG. 2.

Figure 4:
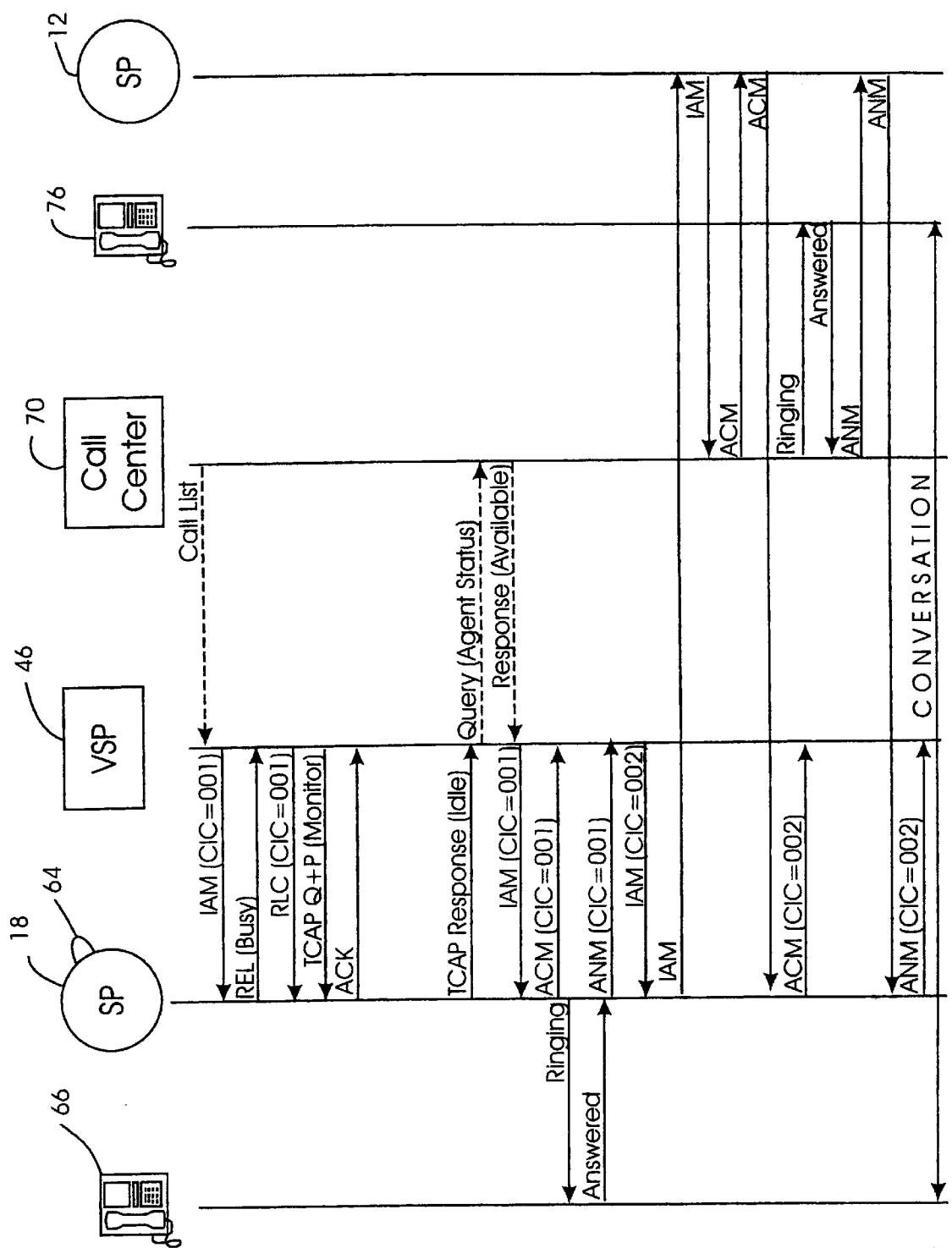
FIG. 4 shows an exemplary call flow sequence illustrating principal actions in a call setup sequence using a system in accordance with the invention to set up calls for a call center.

FIG. 4 shows an exemplary call flow sequence in which VSP 46 (see FIG. 1) is used as an out-dialer to set up calls for a call center 70. Because of the flexibility offered by the VSP, VSP 46 can perform all call setup functions for the call center 70 and because of its position in the signaling network, the VSP 46 is enabled to use PSTN resources much more efficiently than most call center equipment in use today.

In the exemplary call flow sequence shown in FIG. 4, call center 70 sends a called number list to the VSP 46 via a data connection, for example the data communications link 74 (see FIG. 1). The called number list may be supplied at any time and may augment a called number queue already resident on VSP 46. In this example, a called number on the called number list is telephone 66 served by SP 18 (see FIG. 1). The VSP 46 therefore formulates an IAM with a CIC=001 and a called number set to the number of the telephone 66 and forwards the IAM through the STN 10 to the SP 18. In response, the SP 18 checks the availability of telephone 66 and determines that it is busy. The SP 18 therefore returns an ISUP Release (REL) message indicating to the VSP 46 that the call cannot be completed. VSP 46 responds with a Release Complete (RLC) message indicating that CIC=001 has been released.

In order to determine the status of telephone 66, the VSP sends a TCAP Query with Permission (Q+P) message to the SP 18 requesting that the SP 18 monitor the called party line and advise when the line becomes idle. SP 18 responds to the TCAP message with a TCAP Conversation with Permission (C+P) shown in the diagram as an "ACK" response.

When the called party telephone 66 goes on-hook (not illustrated), the SP 18 sends a TCAP response message to the VSP 46 reporting that the called party line is idle. VSP 46 responds to the message by sending a data query message to the call center 70 to determine whether an agent is available to take the call. Alternatively, the VSP may maintain an agent status file in which it maintains the current status of agents that is routinely up dated by the call center, or the VSP 46. In response to the query message, the call center 70 responds that there is an agent available to take the call. Consequently, the VSP 46 launches an IAM with a Circuit Identification Code (CIC) of "001" to connect with the called party. The SP 18 verifies that the called party line for telephone 66 is available and returns an ACM with the CIC=001. Concurrently, the SP 18 applies a ringing signal to the called party line. When the called party answers, the SP 18 returns an ANM message with the CIC=001. On receipt of the ANM message, the VSP 46 sends a second IAM with a CIC=002 and the called number a number for the call center 70. When the SP 18 receives the IAM it assumes that it is associated with an incoming call arriving on the loop-back trunk 64 and examines the called number to determine how the call should be routed. The called number indicates that the call should be routed to the SP 12 which serves the call center 70. The SP 18 therefore formulates an IAM which is forwarded through the STN 10 to the SP 12. SP 12 forwards the IAM to the call center 70 which in this example is assumed to be served by an ISDN trunk with PRI signaling. The ACD or PBX at the call center returns an ACM indicating that an agent phone is available to take the call and an ACM message is sent by SP 12 back to the SP 18 which returns an ACM to the VSP 46. Concurrently, the call center applies a ringing tone or some other advisement message to the agent at telephone 76. When the agent takes telephone 76 off-hook, the ACD or PBX at the call center returns an ANM message to the SP 12 which sends an ANM message to the SP 18. The SP 18 sends an ANM message to the VSP 46 with a CIC=002, which permits the VSP to deduce that the call connection is complete. Thereafter, the called party at telephone 66 is connected with the agent at telephone 76 and conversation ensues.

When conversation is completed, one of the parties will go on-hook which will cause a release sequence similar to that shown in the lower half of FIG. 3b.

It should be understood that there is no requirement to release agents between calls. The agent's connection through SP 12 to the CIC=002 of loop-back trunk 64 may therefore be maintained for an extended time to further conserve signaling resources. If the agents connection is maintained between calls, the data communications link 74 may be used by an agent to indicate to the VSP 46 that a called party should be disconnected. If the VSP 46 receives an indication to that effect, the VSP 46 can send an ISUP REL message with a CIC=001 and the calling and called party numbers to effect the release. Thus agent efficiency can be further improved, while call control is maintained.

Figure 5:
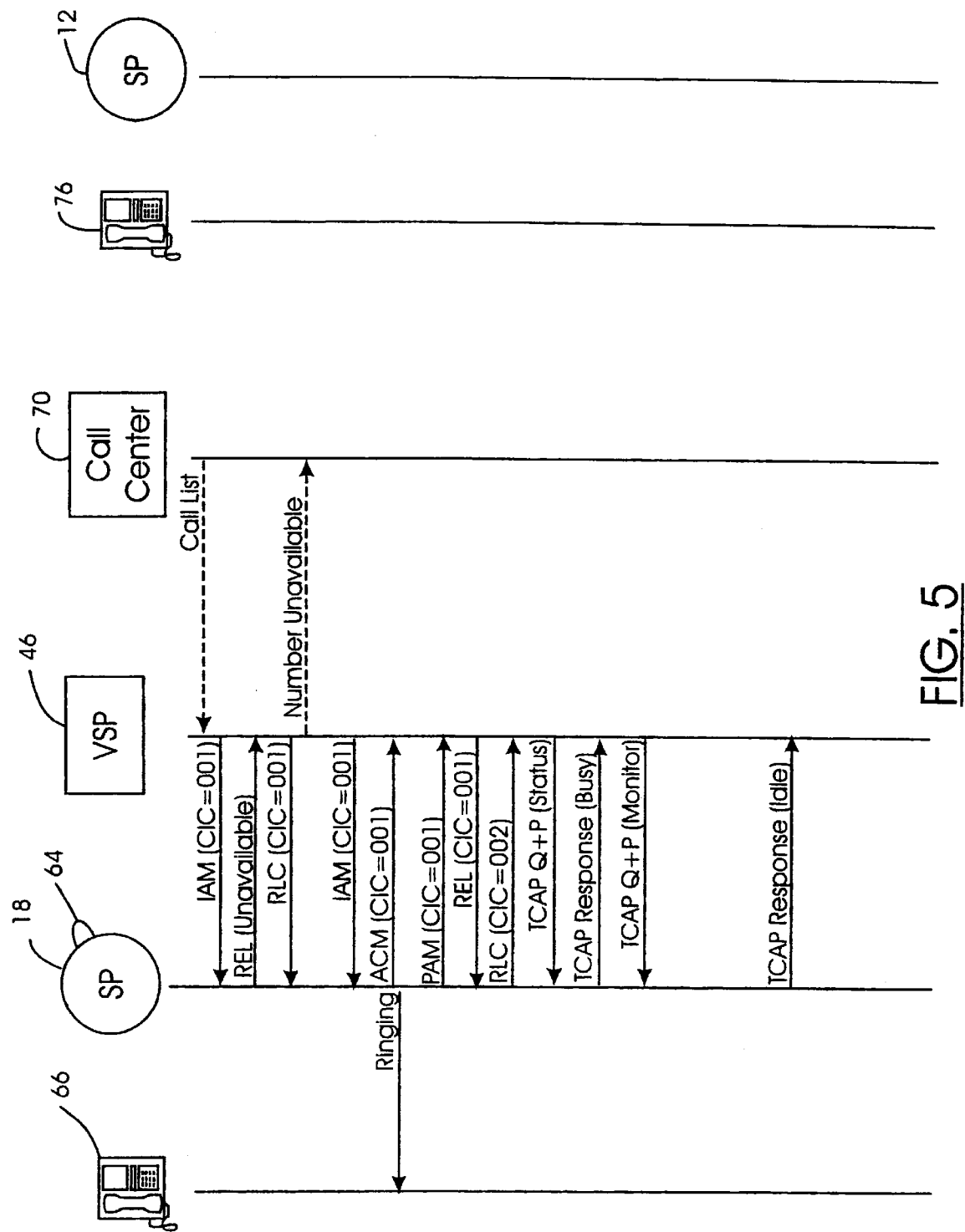
FIG. 5 shows exemplary call flow sequences illustrating principal actions in a call setup sequence using a system in accordance with the invention to set up calls for a call center when the called number is not available or the called party line is in use.

FIG. 5 further illustrates the use of a VSP 46 as an out-dialer for call center 70. In particular, it illustrates efficient use of the STN enabled by the VSP 46 when configured to function as an out-dialer for the call center 70.

In the first example shown in FIG. 5, the VSP 46 receives a call list from the call center 70 and commences a call from the list by formulating a first IAM with a CIC=001 that it forwards to the SP 18. The called number is to a number served by the SP 18 which is no longer in service. The SP 18 responds by returning an ISUP REL message with a cause indicating that the number is unavailable. The VSP 46 is enabled to interpret ISUP Release Causes and recognizes the cause=Unavailable as an indication that the number is no longer in service. The VSP 46 therefore formulates a RLC message with CIC=001 and returns the RLC message to the SP 18. Concurrently, the VSP 46 sends a data message over the data connection 74 (see FIG. 1) to the call center 70 indicating that that called number is no longer available and it should be deleted from all called number lists. Alternatively, the VSP 46 may log such numbers and include them in an exception report which is periodically sent over the data communications link 74 to the call center 70 or reported in some other manner.

In a second example, an IAM including a new called number is formulated by the VSP 46. The IAM has a CIC=001 and includes a called number from the call list. On receipt of the IAM, the SP 18 returns an ACM with a CIC=001 indicating that the called number is available. Concurrently, the SP 18 applies ringing of the called party line. In this example, the called party line has a call waiting feature and a voice mail service. When the call is not answered, the call is forwarded to the voice mail service. This prompts the SP 18 to return a Pass Along Message (PAM) with a CIC=001 to the VSP 46. Parameters in the PAM indicate to the VSP 46 that the call has been forwarded to another number. The VSP 46 therefore responds by sending a Release message with CIC=001 to the SP 18 which terminates ringing to the forwarded number and SP 18 returns an RLC message indicating that the call has been cancelled and release is complete. Since the VSP 46 cannot determine why the call was forwarded from the contents of the PAM message, the VSP forwards a TCAP Q+P message requesting the status of the called party line. The SP 18 responds with TCAP Response message that the called party line is busy. Consequently, the VSP formulates a TCAP Q+P message to the SP 18 requesting that the SP 18 monitor the called party line and report when the called party line becomes idle. Eventually, the SP 18 returns a TCAP response indicating that the called party line is idle.

On receipt of the indication by the SP 18 that the called party line is idle, VSP 46 may query the call center 70, or a list the VSP 46 maintains, to determine if an agent is available to take the call. The VSP 46 completes the call to the called party if the agent is available, as explained above with reference to FIG. 4. Alternatively, the VSP 46 may add the call to the head of the memory queue of numbers to be called. If, however, the TCAP response received by the SP 18 indicates that the called party line is idle rather than busy, the VSP 46 is enabled to deduce that the called party line is unattended. The called number may therefore be placed in a special queue to be called at a later time. Algorithms may be written to determine when calls placed in a special queue are to be retried.

As an alternative, the call may be placed at the bottom of the memory queue of numbers to be called and retried when it arrives again at ahead of the queue. As a further alternative, a call attempt count associated with the number may be incremented when the number is placed at the bottom of the queue. If this option is used, every time a call attempt is made using a call from the memory queue of numbers to be called, the call attempt count is examined to determine whether it has exceeded a predetermined limit, and the called number is removed from the list and added to an exception report, or the like, if the call attempt count exceeds some predetermined value.

The VSP 46 therefore provides an excellent out-dialer for a call center which permits calls to be placed much more economically and intelligently. It also provides an economical mechanism for removing unavailable numbers from called number lists and for efficiently and accurately handling calls to numbers where no called party is available.

The system and the method in accordance with the invention therefore provide additional functionality in the STN which permits service providers to offer more options to calling parties wishing to automate call completion. It also minimizes common channel signaling by ensuring that call setup messages are sent at opportune times to ensure with reasonable certainty that call completion will ensue.

Changes and modifications to the above-described embodiments will no doubt become apparent to persons skilled in the art. The scope of the invention is therefore intended to be limited solely by the scope of the appended claims.

We claim:

1. A method of completing a voice connection between a first and second voice terminal on a Switched Telephone Network (STN), comprising the steps of:

receiving at a Virtual Switching Point (VSP) in the STN having a connection to a data network a call request from a calling party;

sending a query message to an SP in the STN that serves the calling party to determine the availability of a calling line identified in the call request;

if a response to the query message indicates that the calling line is available, sending a first Common Channel Signaling (CCS) message from the VSP over a signaling network of the STN to an SP in the STN to initiate a first leg of the voice connection, and sending a second CCS message from the VSP to an SP in the STN to initiate a second leg of the voice connection, the first and second CCS messages being interrelated to an extent that a circuit identification code in each message is associated with opposite ends of the same facility.

2. A method for using TCAP signaling for improved call set up from a virtual switching point (VSP) in a switched telephone network (STN), comprising:

receiving through a data network a call request message at the VSP, the call request message indicating a calling party number and at least one called party number;

sending a TCAP query message through a common channel signaling system of the STN to a switching point (SP) which serves the calling party number to determine when the calling party number is available to receive a call in response to the message; and on receipt of a TCAP reply message indicating that the calling party number is available to receive the call, initiating from the VSP a call connection between the calling and called party numbers.

3. A method for using TCAP signaling for improved call set up from a VSP as claimed in claim 2 wherein the calling party has a single line connection to the STN, the single line connection being used to send the call request message over the data network to the VSP, and the TCAP query is used to determine when the calling party disconnects from the data network after sending the call request message in order to minimize a number of common channel signaling messaging required to set up a call to the calling party number.

4. A method for using TCAP signaling for improved call set up from a VSP as claimed in claim 3 wherein a TCAP query with permission (QUERY+P) message is sent from the VSP to the SP to determine the availability of the calling party number before any call set up messages are sent form the VSP.

5. A method for using TCAP signaling for improved call set up from a VSP as claimed in claim 4 wherein the SP responds to the QUERY+P message with a conversation with permission (CONVERSATION+P) TCAP message to acknowledge the query request and indicate to the VSP that the SP will scan a calling party line associated with the calling party number to determine when the calling party line is available for call setup.

6. A method for using TCAP signaling for improved call set up from a VSP as claimed in claim 5 wherein when the calling party number becomes available, the SP responds the to the QUERY+P message using a TCAP RESPONSE message to advise the VSP that the calling party line is available for call setup.

7. A method for using TCAP signaling for improved call set up from a VSP as claimed in claim 2 wherein initiating a call connection between the calling and called party numbers involves:

sending a first Initial Address Message (IAM) from the VSP to initiate a first leg of the call connection, the called number in the first IAM being the calling party number;

receiving from the SP that serves the calling party number Address Complete (ACM) and Answer (AMN) messages indicating that the called party has answered and the first leg of the call connection is complete;

sending a second IAM from the VSP to initiate a second leg of the call connection, the called number in the second IAM being the called party number; and receiving from an SP that serves the calling party number an ACM and an ANM message to indicate that the calling party has answered the second leg of the call connection and the call connection is complete.

8. A method for using TCAP signaling for improved call set up from a VSP as claimed in claim 2 wherein if the call connection initiated between the calling and the called party numbers is not completed because a called party line associated with the called party number is busy, the VSP initiates a request for instructions from the calling party to determine further treatment of the call.

9. A method for using TCAP signaling for improved call set up from a VSP as claimed in claim 8 wherein the VSP initiates a request for instructions by sending an IAM from the VSP to connect the calling party with an Interactive Voice Response (IVR) unit in the STN and the IVR prompts the calling party to select one of a number of predefined options respecting further treatment of the call.

10. A method for using TCAP signaling for improved call set up from a VSP as claimed in claim 9 wherein the predefined options include:

a) abandon the call and attempt a next call in the call request message;

b) hold the calling party line open and monitor the called party line until the called party line becomes available;

c) disconnect the calling party line, monitor the called party line and re-attempt the call connection when the called party line becomes available;

d) abandon the call and attempt a next call in the call request message, but monitor the called party line and call the calling party line as soon as the called party line becomes available because the calling party has a call waiting feature;

e) abandon the call and attempt the call connection again if the called party line is available at any time during a specified time period.

11. A method for using TCAP signaling for improved call set up from a VSP as claimed in claim 10 wherein if option b) is selected, the VSP sends a QUERY+P message to an SP which serves the called party, the connection with the IVR is maintained until the called party line becomes available or the calling party terminates the connection, and the IVR plays audible content to the calling party on hold.

12. A method for using TCAP signaling for improved call set up from a VSP as claimed in claim 10 wherein if option c) is selected the VSP sends a QUERY+P message to an SP which serves the called party after the calling party line is disconnected, and on receipt of a RESPONSE message indicating that the called party line is available, the VSP sends a first IAM in which the called number is the calling party number to initiate a first leg of the call connection and on receipt of an ACM and ANM message in response to the IAM, the VSP sends a second IAM in which the called number is the called party number in order to complete a second leg of the call connection.

13. A method for using TCAP signaling for improved call set up from a VSP as claimed in claim 10 wherein if the option d) is selected the VSP sends a QUERY+P message to an SP which serves the called party after the IVR is disconnected, and on receipt of a RESPONSE message indicating that the called party line is available, the VSP sends a first IAM in which the called number is the calling party number to initiate a first leg of the call connection and a second IAM in which the called number is the called party number in order to complete a second leg of the call connection without waiting for an ACM or an ANM message from either end of the call connection.

14. A method for using TCAP signaling for improved call set up from a VSP as claimed in claim 10 wherein if the option e) is selected the VSP sends a QUERY+P message to an SP which serves the called party at a start of the specified time period, and if a RESPONSE message indicating that the called party line is available before an end of the specified time period, the VSP sends a first IAM in which the called number is the calling party number to initiate a first leg of the call connection and on receipt of an ACM and an ANM to indicate that the called party has answered, the VSP sends a second IAM in which the called number is the called party number in order to complete a second leg of the call connection;

but, if the calling party does not answer in response to the first IAM or the specified time expires before the calling party line becomes available, the VSP deletes the request and frees associated resources.

15. A system for using TCAP signaling for improved call set up in a switched telephone network (STN), comprising;

a virtual switching point (VSP) which is a physical node in a common channel signaling network of the STN and a logical node in a transport network of the STN, the VSP having TCAP signaling capability;

a plurality of switching points (SPs) in the STN, at least a portion of the SPs in the STN having TCAP signaling capability;

a trunk facility in the STN, the VSP being a logical switching node logically located between physical ends of the trunk facility; and a server connected to a data network and accessible through the data network, the server accepting call requests from calling parties having access to the data network.

16. A system for using TCAP signaling for improved call set up in an STN as claimed in claim 11 wherein the VSP has a connection to the data network and receives the call requests from the server, the VSP setting up call connections between the calling party and a called party specified in the call request by a called party number.

17. A system for using TCAP signaling for improved call set up in an STN as claimed in claim 16 wherein the system further includes a gateway switch located between the VSP and the data network to isolate the VSP from the data network to prevent direct access to the VSP form the data network.

18. A system for using TCAP signaling for improved call set up in an STN as claimed in claim 15 wherein the system further includes an interactive voice response unit (IVR) in the STN, the IVR accepting calls set up by the VSP between the calling party and the IVR when a call connection cannot be set up by the VSP between the calling party and a called party specified in a call request message.

19. A system for using TCAP signaling for improved call set up in an STN as claimed in claim 18 wherein the IVR has a data link with the VSP and the IVR is enabled to communicate an option respecting further call handling which is chosen by the calling party in response to prompting messages presenting a number of predefined options for further call handling.

20. A system for using TCAP signaling for improved call set up in an STN as claimed in claim 19 wherein a one of the predefined options permits the calling party to stay on hold while the called party line is monitored for availability to take a call from the calling party and the IVR is enabled to play audible content during a period that the calling party is held by the IVR.

21. A method of completing calls for a call center having a predetermined list of numbers to be called, comprising:

placing the list of numbers to be called in a memory queue which may be accessed by a virtual switching point (VSP) in the network;

formulating a first IAM at the VSP, the IAM containing a called number from the queue, and forwarding the IAM to initiate a call connection with the called number; and on receipt of an Address Complete (ACM) and an Answer (ANM) message in response to the first IAM, formulating a second IAM at the VSP, the second IAM including a number of the call center as the called number and forwarding the second IAM to connect the called number with the call center.

22. The method of completing calls to a call center as claimed in claim 21 wherein if an ISUP Release message is received at the VSP in response to the first IAM, the cause associated with the Release message is examined to determine a course of action respecting a further treatment of the called number.

23. The method of completing calls to a call center as claimed in claim 22 wherein if the ISUP Release message indicates that a line associated with the called number is busy, the VSP sends a TCAP message to a switching point that serves the line requesting that the line be monitored to determine when the line becomes idle.

24. The method of completing calls to a call center as claimed in claim 23 wherein on receipt of a TCAP response message indicating that the line is idle, the VSP checks the availability of an agent at the call center to receive a call and the VSP sends a first IAM if an agent is available to receive the call.

25. The method of completing calls to a call center as claimed in claim 24 wherein the VSP checks the availability of an agent to take the call by sending a data query message to an automatic call distributor or a private branch exchange at the call center.

26. The method of completing calls to a call center as claimed in claim 25 wherein a predictive algorithm is used to determine the availability of an agent to receive the call.

27. The method of completing calls to a call center as claimed in claim 23 wherein on receipt of a TCAP response message indicating that the line is idle, the VSP places the called number associated with the response at the head of the memory queue of numbers to be called.

28. The method of completing calls to a call center as claimed in claim 22 wherein if the cause associated with the ISUP release message indicates that the number is unavailable, the number is removed from the list of numbers to be called and a data message is sent to the call center indicating that the number is unavailable.

29. The method of completing calls to a call center as claimed in claim 28 wherein the message sent to the call center is a part of an exception report indicating all numbers removed from the list of numbers to be called and a reason that each number was removed from the list.

30. The method of completing calls to a call center as claimed in claim 22 wherein if an ISUP Pass Along Message (PAM) is received in response to the first IAM indicating that the call has been forwarded to another number, an ISUP Release message is sent back to a switching point that serves the called number to cancel the call.

31. The method of completing calls to a call center as claimed in claim 30 wherein after the ISUP Release message is sent, a TCAP message is sent to the switching point to determine a status of the a line associated with the called number.

32. The method of completing calls to a call center as claimed in claim 31 wherein if a response to the TCAP message indicates that the line associated with the called number is busy, a TCAP message is sent to the switching point requesting that the line be monitored to determine when the line becomes idle.

33. The method of completing calls to a call center as claimed in claim 32 wherein on receipt of a TCAP response message indicating that the line is idle, the VSP checks the availability of an agent at the call center to receive a call and the VSP sends a first IAM if an agent is available to receive the call.

34. The method of completing calls to a call center as claimed in claim 33 wherein the VSP checks the availability of an agent to take the call by sending a data query message to an automatic call distributor or a private branch exchange at the call center.

35. The method of completing calls to a call center as claimed in claim 34 wherein a predictive algorithm is used to determine the availability of an agent to receive the call.

36. The method of completing calls to a call center as claimed in claim 32 wherein on receipt of a TCAP response message indicating that the line is idle, the VSP places the called number associated with the response at the head of the memory queue of numbers to be called.

37. The method of completing calls to a call center as claimed in claim 31 wherein if the response to the TCAP message indicates that the line is idle, the called number is placed in a special queue of numbers to be called at a later time.

38. The method of completing calls to a call center as claimed in claim 31 wherein if the response to the TCAP message indicates that the line is idle, the called number is placed at a bottom of the memory queue.

39. The method of completing calls to a call center as claimed in claim 38 wherein if the called number is placed at a bottom of the memory queue, a call attempt count associated with the number is incremented and the called number is removed from the memory queue and added to an exception report when the call attempt count reaches a predetermined value.

40. An out-dialer for a call center, comprising:
a virtual switching point (VSP) which is a physical node in a signaling network of a switched telephone network (STN) which serves the call center, the VSP being a physical node in a signaling network which controls the STN and a virtual node in at least one transport facility of the STN; and
a memory queue accessible by the VSP, the memory queue containing at least one list of called numbers to which calls are to be set up by the VSP.

41. An out-dialer for a call center as claimed in claim 40 wherein the VSP has a data communications link with the call center to permit data messages to be exchanged between the VSP and the call center.

42. An out-dialer for a call center as claimed in claim 40 wherein the VSP sets up calls to called numbers by sending a first ISUP IAM message to a switching point associated with an end of a transport facility in which the VSP is a virtual node, the first ISUP IAM message containing the called number.

43. An out-dialer for a call center as claimed in claim 42 wherein the VSP completes the set up of the call by sending a second ISUP IAM message which includes a called number that is a number of the call center.

44. An out-dialer for a call center as claimed in claim 42 wherein after a initial connection with an agent at a call center, the VSP does not disconnect the agent between calls unless explicitly instructed to do so by a data message sent over a data communications link with the call center.

\* \* \* \* \*